(12) United States Patent
Balestrino et al.

(10) Patent No.: US 8,840,764 B2
(45) Date of Patent: Sep. 23, 2014

(54) ELECTROLYSIS APPARATUS FOR THE PRODUCTION OF ELECTRICITY AND HYDROGEN

(75) Inventors: Cristiano Balestrino, Derby (GB); Gerard D. Agnew, Derby (GB); Michele Bozzolo, Derby (GB)

(73) Assignee: LG Fuel Cell Systems Inc., North Canton, OH (US)

( * ) Notice: Subject to any disclaimer, the term of this patent is extended or adjusted under 35 U.S.C. 154(b) by 591 days.

(21) Appl. No.: 12/153,940

(22) Filed: May 28, 2008

(65) Prior Publication Data

US 2008/0314741 A1 Dec. 25, 2008

(30) Foreign Application Priority Data

Dec. 1, 2005 (GB) .................................. 0524486.8

(51) Int. Cl.
| | | |
|---|---|---|
| H01M 8/06 | (2006.01) | |
| C25B 1/04 | (2006.01) | |
| H01M 8/04 | (2006.01) | |
| C25B 9/00 | (2006.01) | |
| H01M 16/00 | (2006.01) | |
| C25B 15/08 | (2006.01) | |
| H01M 8/12 | (2006.01) | |

(52) U.S. Cl.
CPC .. *C25B 1/04* (2013.01); *H01M 8/12* (2013.01); *H01M 8/04097* (2013.01); *Y02E 60/50* (2013.01); *C25B 9/00* (2013.01); *H01M 8/0656* (2013.01); *H01M 16/00* (2013.01); *Y02E 60/366* (2013.01); *C25B 15/08* (2013.01)
USPC .............................. 204/239; 205/343; 429/418

(58) Field of Classification Search
CPC ..... C25B 5/00; H01M 8/0656; Y02E 60/366; Y02E 60/50; Y02E 60/56; Y02E 60/563; Y02E 60/566; Y02E 60/525; Y02E 70/20
USPC .......................... 204/241, DIG. 4, 237, 239; 205/626–639, 343; 429/422, 418
See application file for complete search history.

(56) References Cited

U.S. PATENT DOCUMENTS

| | | | | |
|---|---|---|---|---|
| 4,622,275 | A | * | 11/1986 | Noguchi et al. .............. 429/423 |
| 4,657,829 | A | | 4/1987 | McElroy |
| 4,853,100 | A | | 8/1989 | Hsu |

(Continued)

FOREIGN PATENT DOCUMENTS

| | | |
|---|---|---|
| EP | 1 600 374 A | 11/2005 |
| WO | WO 95/28510 A | 10/1995 |
| WO | 2004032273 A2 | 4/2004 |

OTHER PUBLICATIONS

Chinese Office Action (issued Jan. 29, 2010) and Chinese Agent reporting letter (dated Mar. 2, 2010).

*Primary Examiner* — Nicholas A Smith
*Assistant Examiner* — Ciel Thomas
(74) *Attorney, Agent, or Firm* — Jeffrey S. Melcher; Manelli Selter PLLC

(57) ABSTRACT

An electrolysis apparatus comprises an electrolysis cell to electrolyze a first fluid to generate a product fluid. The electrolysis apparatus also comprises a fuel cell to electrolyze an electrolytic fluid and to heat a second fluid. The electrolysis apparatus also includes a fluid transfer arrangement to transfer the heated second fluid from the fuel cell to the electrolysis cell to provide heat to drive the electrolysis of the first fluid in the electrolysis cell.

35 Claims, 3 Drawing Sheets

(56) References Cited

U.S. PATENT DOCUMENTS

| | | | |
|---|---|---|---|
| 5,479,462 A * | 12/1995 | Yamauchi et al. | 376/325 |
| 6,660,417 B1 * | 12/2003 | Nishio et al. | 429/422 |
| 7,118,818 B2 * | 10/2006 | Agnew et al. | 429/423 |
| 2004/0062973 A1 * | 4/2004 | Agnew et al. | 429/34 |
| 2004/0180249 A1 * | 9/2004 | Pham et al. | 429/33 |
| 2006/0068248 A1 * | 3/2006 | Ruhl | 429/21 |

* cited by examiner

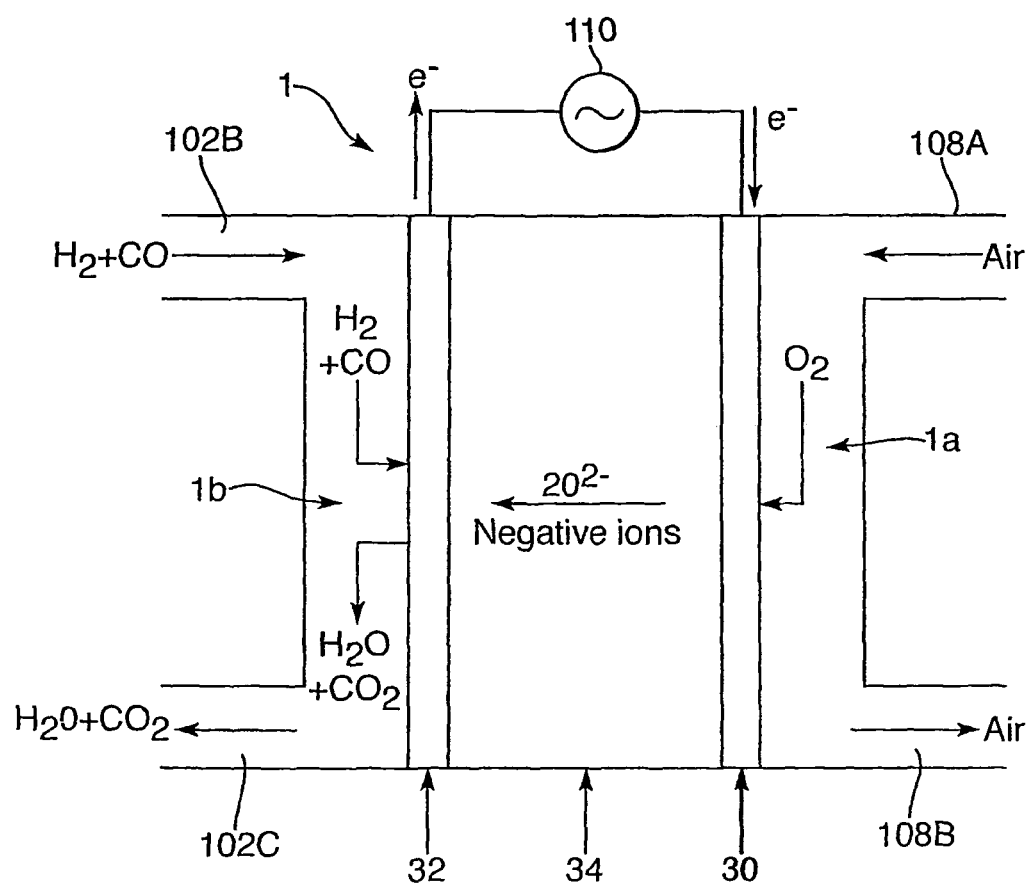

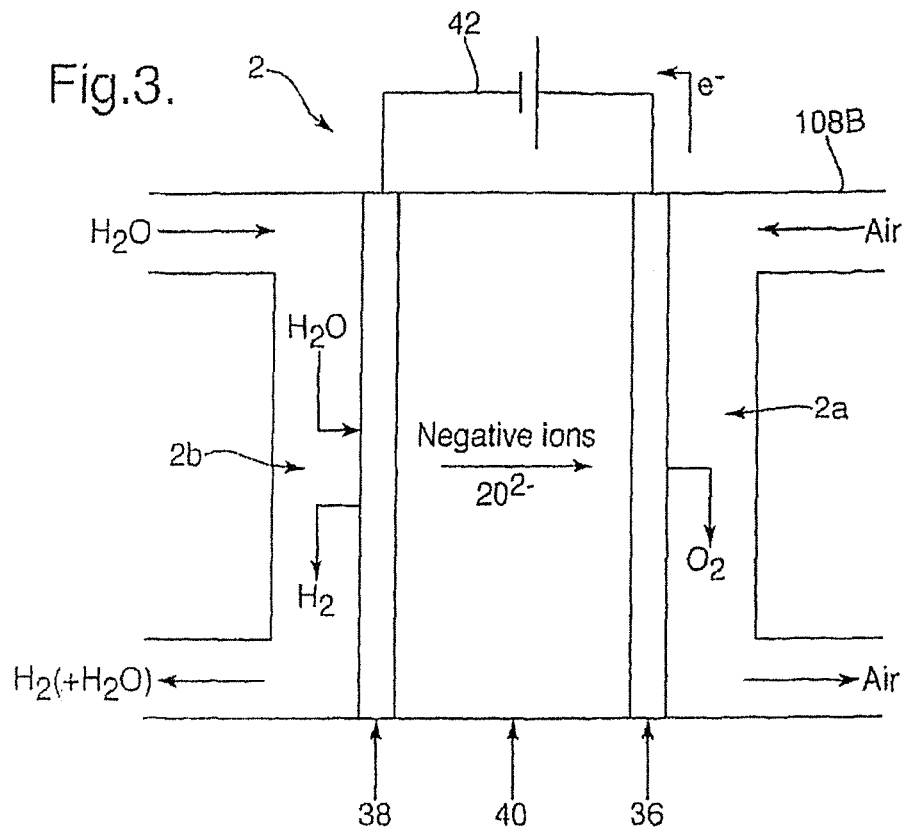
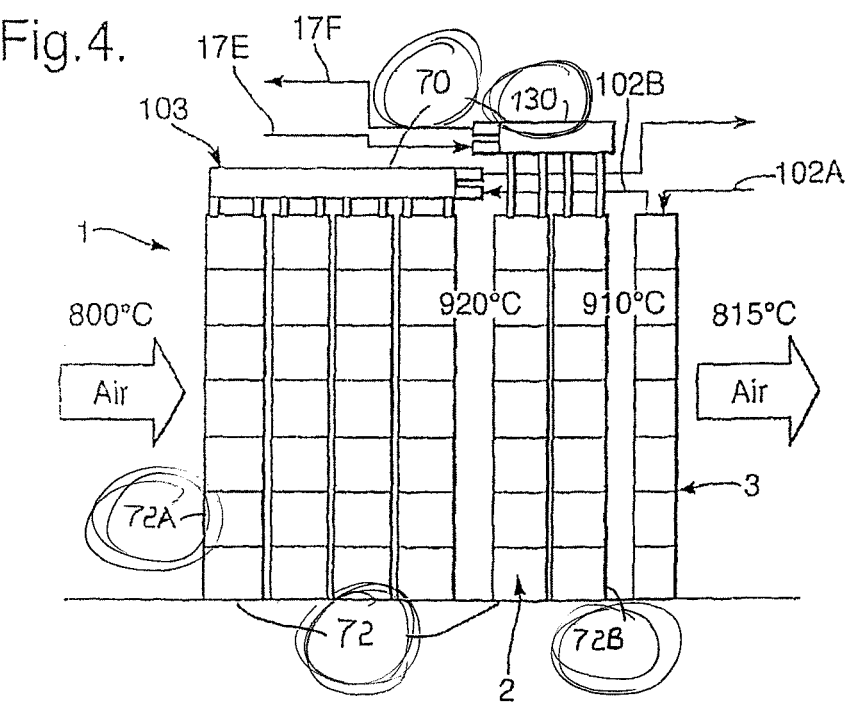

US 8,840,764 B2

ELECTROLYSIS APPARATUS FOR THE PRODUCTION OF ELECTRICITY AND HYDROGEN

CROSS-REFERENCE TO RELATED APPLICATIONS

This application is a continuation of International Application Number PCT/GB2006/004091, filed Nov. 1, 2006, designating the United States, which claims priority to GB 0524486.8, filed Dec. 1, 2005.

BACKGROUND OF THE INVENTION

This invention relates to an electrolysis apparatus. More particularly, but not exclusively, the invention relates to a fluid generating apparatus. Embodiments of the invention relates to a hydrogen generating apparatus, such as a hydrogen generating apparatus incorporating electrolysis cells.

Water electrolysis is used as a simple and clear technology for hydrogen production. Water is electrolysed to produce oxygen at the anode and hydrogen at the cathode. The hydrogen can then be stored.

SUMMARY OF THE INVENTION

According to one aspect of this invention, there is provided an electrolysis apparatus comprising: an electrolysis cell to electrolyse a first fluid to generate a product fluid; a fuel cell to electrolyse a fuel and to heat a second fluid; and means to transfer the heated second fluid from the fuel cell to the electrolysis cell to provide heat to drive the electrolysis of the first fluid in the electrolysis cell.

In one embodiment, the electrolysis apparatus may be arranged to generate a fluid, such as a gas. The gas may be hydrogen or carbon monoxide.

In one embodiment, the first fluid may comprise water. In this embodiment, the product fluid may comprise hydrogen. In another embodiment, the first fluid may comprise carbon dioxide. In this embodiment, the product fluid may comprise carbon monoxide.

The electrolysis cell may be arranged to operate at a temperature in the range of 800° to 1000° C. It is an advantage of the preferred embodiment of this invention that the apparatus is suitable for converting a low heating value fluid to a high heating value fluid.

The fuel cell may comprise a solid oxide fuel cell. The electrolysis cell may comprise a solid oxide electrolysis cell. The fuel cell and the electrolysis cell may each be part of the same electrolysis stack.

The second fluid transfer means may comprise a second fluid transfer arrangement. In one embodiment, the fuel cell comprises an anode to electrolyse the fuel to provide fuel products. In this embodiment, the fuel cell comprises a fuel supply means to supply the fuel to the fuel cell. The fuel cell may comprise an exhaust arrangement to exhaust the fuel products from the fuel cell.

The electrolysis apparatus may further include a fuel recycling arrangement to recycle at least some of the fuel products to the fuel cell. The fuel recycling arrangement may recycle at least some of the fuel products to the fuel supply arrangement. The recycling arrangement may comprise a fuel recycling device, such as an ejector, which may entrain the aforesaid fuel products to recycle them from the fuel cell. The fuel recycling device is preferably disposed in the fuel supply arrangement.

The electrolysis apparatus may comprise a fuel converter to convert a precursor fuel to the fuel. The precursor fuel may comprise a hydrocarbon fuel, preferably an alkane, such as methane. The fuel provided by the fuel converter may comprise hydrogen and may also include carbon monoxide. In the preferred embodiment, the fuel converter may comprise a reformer.

The electrolysis apparatus preferably includes heating means to heat the precursor fuel to effect the aforesaid conversion. The heating means may comprise a heating fluid supply assembly to transfer a heating fluid to the fuel converter. The heating fluid supply assembly may be arranged to transfer the heat of the second fluid to the fuel converter.

The heating means may comprise a heat exchanger having first and second heat transfer sides. The heating fluid may pass along the first side and the precursor fuel may pass along the second side to be converted to the fuel.

The fuel cell may comprise a cathode, whereby a component of the second fluid is electrolysed by the cathode. The fuel cell may comprise a second fluid supply means to supply the second fluid to the fuel cell. The aforesaid electrolysed component of the second fluid may comprise oxygen. In the preferred embodiment the second fluid comprises air.

In one embodiment, the electrolysis cell may comprise a cathode to electrolyse the first fluid. In this embodiment, the electrolysis cell comprises a first fluid supply arrangement to supply the first fluid to the electrolysis cell. The electrolysis cell may comprise a product fluid exhaust arrangement to exhaust the product fluid from the electrolysis cell.

The electrolysis apparatus may include a combustor to provide combustion products. Preferably, the combustor is arranged to combust at least some of the fuel products from the fuel cell.

The electrolysis apparatus may comprise a second fluid supply arrangement to supply the second fluid to the fuel cell. The second fluid supply arrangement may comprise a compressor to compress the second fluid. The second fluid supply arrangement may comprise a fluid recycling device to recycle combustion products from the combustor to the fuel cell. The fluid recycling device may comprise a fluid recycling ejector, which may entrain the aforesaid combustion products.

The second fluid supply arrangement may be arranged to supply the second fluid to the cathode side of the fuel cell.

The electrolysis apparatus may comprise a second fluid exhaust arrangement to exhaust the second fluid from the electrolysis cell.

At least some of the exhausted second fluid may be fed to the combustor for combustion. The combustion products from the combustor may comprise the combusted exhausted second fluid.

The electrolysis apparatus may comprise a gas turbine arrangement, and may have turbine feed means to feed some of the exhausted second fluid to a turbine. Preferably, the turbine is coupled to a compressor, whereby the turbine can drive the compressor.

The electrolysis apparatus may comprise an evaporator to recover heat from the exhausted second fluid which may be delivered thereto from the turbine.

The electrolysis apparatus may further include a product fluid recycling arrangement to recycle at least some of the product fluid to the electrolysis cell. The product fluid recycling arrangement may recycle at least some of the product fluid to the first fluid supply arrangement.

The product fluid recycling arrangement may comprise a product fluid recycling device to recycle at least some of the product fluid from the electrolysis cell. Preferably, the product fluid recycling device is arranged in the first fluid supply arrangement. The product fluid recycling device may comprise a product fluid recycling ejector, which may entrain the aforesaid product fluid.

The electrolysis apparatus may further include a first fluid heater to heat the first fluid to be supplied to the electrolysis cell. The first fluid heater may comprise a heat exchanger to transfer heat from the product fluid to the first fluid.

The electrolysis apparatus may include a separator arrangement to condense water from the product fluid and to recycle the water to the first fluid. The separator arrangement may also be arranged to allow hydrogen to be fed therefrom. The separator arrangement may comprise a first fluid pump to pump the first fluid to the electrolysis cell.

The separator arrangement preferably includes a first fluid feed assembly to feed the first fluid to the evaporator. The first fluid feed assembly may be arranged to feed the first fluid from the evaporator to the first fluid heater.

Preferably, the first fluid heater heats the first fluid to a temperature above the boiling point of the first fluid. Where the first fluid comprises water, the first fluid heater may heat the first fluid to provide superheated steam. The first fluid feed assembly may be arranged to feed the heated first fluid to the first fluid ejector to entrain the product fluid.

BRIEF DESCRIPTION OF THE DRAWINGS

An embodiment of the invention will now be described by way of example only, with reference to the accompanying drawings, in which

FIG. 2 is a diagrammatic sectional view of a fuel cell;

FIG. 3 is a diagrammatic sectional view of an electrolysis cell; and

FIG. 4 is a diagrammatic side view of the electrolysis cell, the fuel cell and a fuel converter.

DETAILED DESCRIPTION OF THE INVENTION

Figure 1:
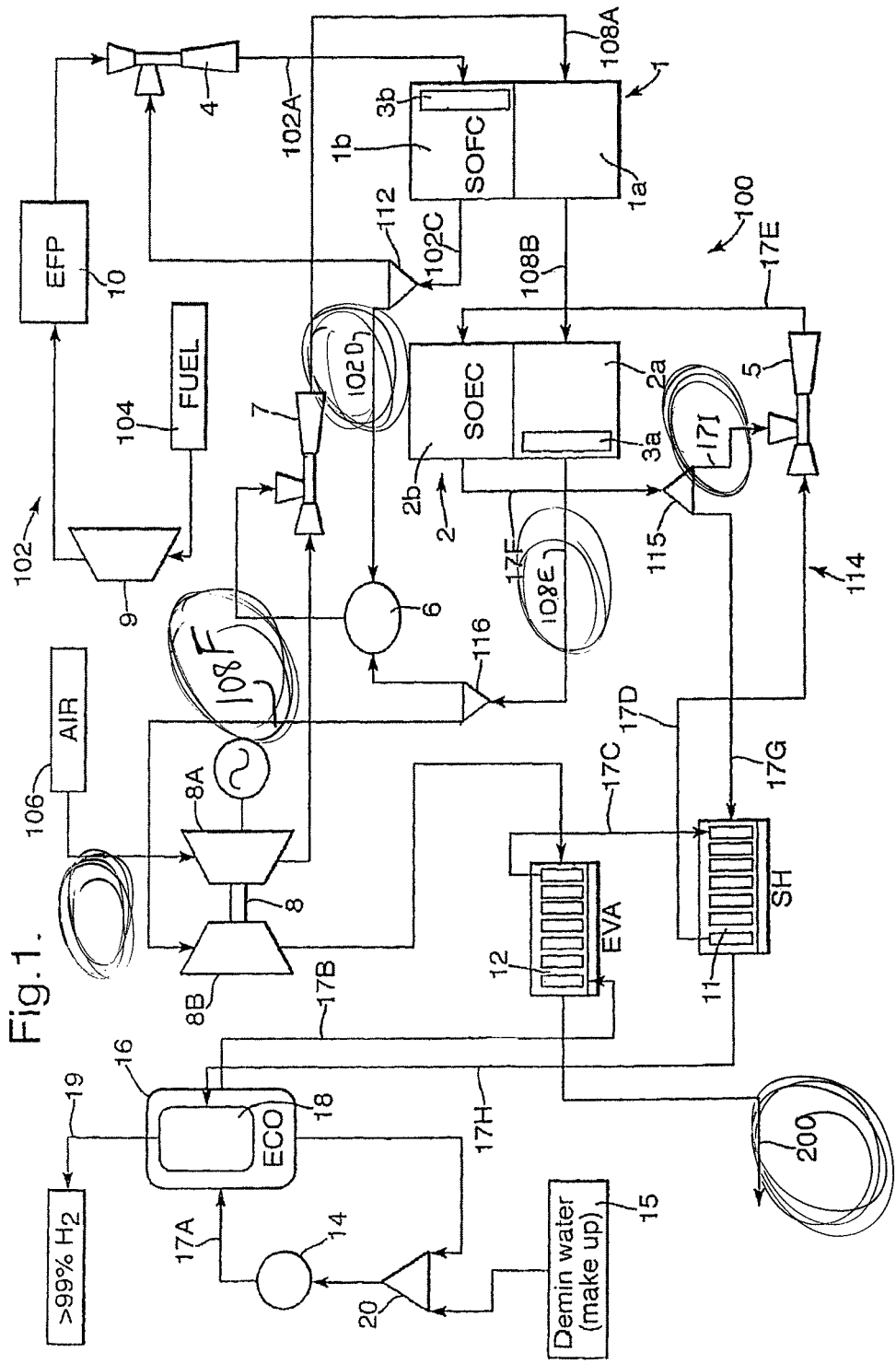
FIG. 1 is a schematic view of a hydrogen generating apparatus.

Referring to FIG. 1, there is shown a schematic diagram of a hydrogen generating apparatus 100 which comprises a fuel cell 1 in the form of a solid oxide fuel cell having a cathode side 1a and an anode side 1b.

Referring to FIG. 2, there is shown the fuel cell 1 comprising the cathode side 1a having a cathode 30, the anode side 1b having an anode 32, and a solid oxide electrolyte 34 arranged between the cathode 30 and the anode 32.

The apparatus 100 also includes an electrolysis cell 2 in the form of a solid oxide electrolysis cell. The electrolysis cell 2 comprises an anode side 2a and a cathode side 2b.

Referring to FIG. 3, there is shown the electrolysis cell 2 comprising the anode side 2a having an anode 36, the cathode side 2b having a cathode 38 and a solid oxide electrolyte 40 arranged between the anode 36 and the cathode 38.

The fuel cell 1 and the electrolysis cell 2 can be part of a single stack 70 (see FIG. 4) of electrochemical cell tubes 72. The electrochemical cell tubes 72 can be in the form of known electrochemical cell tubes, having a construction that would be familiar to those skilled in the art. An example of a stack of electrochemical cell tubes is shown and described in WO 2004/032273.

In FIG. 4, some of the electrochemical cell tubes 72 are designated 72A, and some are designated 72B. The electrochemical cell tubes 72A form the fuel cell 1, and the electrochemical cell tubes 72B form the electrolysis sell 2. The structure of the stack 70 is described in more detail below.

A fuel converter 3 in the form of a reformer (shown in more detail in FIG. 4) is provided to convert the fuel for the apparatus 100 to a usable form, as explained below. Hot air through the anode side 2a of electrolytic cell 2 passes along an air side 3a (as shown in FIG. 1) of the converter 3, and the fuel passes through a fuel side 3b (see FIG. 1) of the converter to be heated by the heated air on the air side 3a and converted from a precursor fuel, for example, methane, to the fuel, namely hydrogen and carbon monoxide. The fuel then passes from the fuel side 3b of the converter 3 to the anode side 1b of the fuel cell 1.

The apparatus 100 also includes an fuel feed arrangement 102 to feed the precursor fuel to the fuel side 3b of the converter 3. The fuel feed arrangement 102 comprises a supply of fuel 104, a pump 9 to pump the fuel and an external fuel pre-processor (EFP) 10 to pretreat the fuel prior to being fed to the fuel cell 1, for example, to remove higher hydrocarbons and sulphur compounds from the precursor fuel. The fuel feed assembly 102 also includes a fuel recycling device which may be in the form of a fuel recycling ejector 4, as will be explained below. Precursor fuel from the fuel recycling ejector 4 is fed to the converter 3 by the line 102A, as shown in FIGS. 1 and 4. The converted fuel from the converter 3 is fed via the line 102b (see FIG. 4) to the anode side 1b of the fuel cell 1. A manifold 103 feeds the fuel to the anode side 1b of the fuel cell. As can be seen from FIG. 4, the fuel feed manifold 103 is communicatively connected to the fuel cell tube 72A to feed the fuel to the fuel cell tubes 72A.

A second fluid in the form of air 106 is passed to a compressor 8A of a gas turbine arrangement 8. The gas turbine arrangement 8 also includes a turbine 8B for purposes which will be explained below. The turbine 8B drives the compressor 8A and the work done by the turbine 8B can be used to generate electrical power.

The compressor arrangement 8 is arranged within an air feed arrangement to feed a second fluid in the form of air to the fuel cell 1. Air compressed by the compressor 8A is then passed through a fluid recycling device such as a fluid recycling ejector 7 for reasons that will be explained below, and then to the cathode side 1a of the fuel cell 1 via the line 108a. The air compressed by the compressor 8 is at a temperature of around 800° C. The air passing through the cathode side 1a of the fuel cell 1 undergoes electrolysis and oxygen ions migrate across the solid electrolyte 34. Air depleted with oxygen passes from the cathode side 1a of the fuel cell via the line 108B.

Fuel in the form of hydrogen and carbon monoxide entering the anode side 1b of the fuel cell 1 undergo electrochemical reactions at the anode 32 with the oxygen ions from the electrolyte 34 to form water and carbon dioxide.

Heat is released through the fuel cell 1 due to the exothermic nature of the electrochemical reactions and energy dissipation into heat caused by ohmic and activational losses. This heat is absorbed by the air passing through the cathode side 1a, such that air passing out of the cathode side 1a of the fuel cell 1 is passed to the anode side 2a of electrolysis cell 2 via the line 108B and is heated to a temperature of substantially 920° centigrade. Thus, heat is transferred from the fuel cell 1 to the electrolysis cell 2. Where the fuel cell 1 and the electrolysis cell 2 are part of the same stack of electrochemical cell tubes 72, the line 108B can be the means which allows the air to pass from one electrochemical cell tube 72 to the next.

An electron flow (indicated by the arrows labeled e⁻) is created by the electro-chemical reactions in the fuel cell 1 and provides electric power as indicated at 110 in FIG. 2. FIG. 3 shows that the electrolysis cell 2 requires an external power supply 42. At least some of this power can be obtained from within the hydrogen generating apparatus 100, such as by the electric power generated by the fuel cells 1.

The exhaust products from the anode side 1b of the fuel cell 1, namely, water and carbon dioxide produced by the electrochemical reaction together with some unelectrolysed hydrogen and carbon monoxide, pass out of the anode side 1b via the line 102C to a splitter 112 (see FIG. 1).

The fuel recycling ejector 4 entrains via a line 102C, some exhaust products from the anode side 1b of the fuel cell 1 in the splitter 112 to be recycled back to the fuel cell 1 along the line 102A. The remainder of these exhaust products are passed from the splitter 112 to a combustor 6 via a line 102D, as will be explained below.

The heated air passing along the line 108B from the cathode side 1a of the fuel cell 1 passes to the anode side 2a of the electrolysis cell 2. This provides heat for the electro-chemical reaction on the cathode side 2b of the electrolysis cell 2. Water enters the cathode side 2b of the electrolysis cell 2 via a first fluid feed arrangement 114. The first fluid feed arrangement 114 comprises a separator 16 having a condenser 18. The separator 16 receives incoming water from a line 17A and passes this water to an evaporator 12 via a line 17B. The evaporator 12 converts this water to steam. The evaporator 12 is heated by air from the electrolysis cell 2, as explained below.

The steam passes out of the evaporator 12 via line 17C to a super-heater 11 to create super-heated steam at a temperature of up to 500° C. The super-heated steam then passes from the super-heater 11 via the line 17D to a product fluid recycling ejector 5. After passing through the product fluid recycling ejector 5, the steam and products entrained thereby pass via the line 17E to a manifold 130 (see FIG. 4) and then to the cathode side 2b within the tubes 72B of the electrolysis cell 2.

After electrolysis in the electrolysis cell 2, the hydrogen and water generated are exhausted therefrom via the line 17F which passes the hydrogen and remaining water to a splitter 115, some of the hydrogen and water in the splitter 115 is entrained by the ejector 5 via a line 17I and fed back to the cathode side 2b of the electrolysis cell 2. The remainder of the hydrogen and water which is at a temperature of 800° to 850° C. is fed to the super-heater 11 from the splitter 115 via a line 17G.

After exchanging heat in the super-heater 11, the water and hydrogen mixture passes to the separator 16 via the line 17H. In the separator, the water is condensed in the condenser 18 and the hydrogen removed via the line 19.

The condensed water is then fed to a combiner 20 where it is mixed with demineralised water, as shown at 15. The water is then pumped by a pump 14 to the separator 16 via the line 17A to condense water from the hydrogen in the condenser 18 and then to the evaporator 12 via the line 17B.

The heated air passing from the cathode side 1a of the fuel cell 1 to the anode side 2a of the electrolysis cell 2 receives oxygen from the oxygen ions transported across the electrolyte 40 in the electrolysis cell 2. This air is exhausted from the anode side 2a of the electrolysis cell 2 to a splitter 116 via a line 108E. Some of the air is passed from the splitter 116 to the combustor 6 for combustion. The combustion products from the combustor 6 are then entrained by the fluid recycling ejector 7 for recycling back to the cathode side 1a of the fuel cell 1 via the line 108A. The remainder of the heated air from the anode side 2a of the electrolysis cell 2 is passed from the splitter 116 via a line 108F to the turbine 8B of the gas turbine arrangement 8 where it expands through the turbine 8B to drive the compressor 8A. The air exiting the turbine 8B passes through the evaporator 12 to heat the incoming water. The air is then exhausted via the line 200.

As described, an efficient apparatus for generating hydrogen from water which utilises a fuel cell and an electrolysis cell arranged in series with each other. The embodiment has the advantage that the fuel cell can generate electricity and can also generate the necessary heat to drive the electrochemical reaction in the electrolysis cell.

Various modifications can be made without departing from the scope of the invention. For example, the recycling arrangements may not be necessary. Also, the electrolysis apparatus may be a carbon monoxide generator, in which case carbon dioxide is fed to the cathode side 2b of the electrolysis cell 2 to be electrolysed to carbon monoxide. Where the electrolysis apparatus 100 is used as a carbon monoxide generator, the exhaust products from the cathode side 2b of the electrolysis cell 2 will be carbon monoxide and unreacted carbon dioxide. Appropriate separator means, as would be known by persons skilled in the art, will be required to separate the carbon dioxide from the carbon monoxide.

The advantages of the preferred embodiment are as follows. Hydrogen produced in the preferred embodiment of this invention comes from water and is free from contaminants, whereas hydrogen produced by conventional means, such as by re-forming natural gas, may require purification to remove sulphur compounds and carbon monoxide. It is important, since hydrogen production will be required as more cars are manufactured to use hydrogen as their fuel.

Moreover, the temperature requirements to drive the reactions are not excessive, and there are no critical design requirements for heat exchangers or other components. Also, the preferred embodiment requires a simple design of chemical plant, as described above.

In some circumstances, the electric power produced by the fuel cell 1 and/or the gas turbine arrangement 8 can be consumed by the electrolysis cell 2. Alternatively, the power output from the fuel cell 1 could be fed to the electricity grid after being converted to AC. The electrolysis cell 1 could then be powered by electricity from the electrical grid, appropriately converted to DC.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electrolysis apparatus comprising:
an electrolysis cell for receiving a first fluid, for electrolyzing a portion of the first fluid in order to generate a product fluid consisting of a substance that is a product of electrolysis performed by the electrolysis cell on the first fluid, and for outputting an un-electrolyzed portion of the first fluid and the product fluid, wherein the electrolysis cell comprises an anode and a cathode;
a fuel cell to oxidize a fuel and to heat a second fluid, said second fluid being different than the fuel and different than the first fluid, the fuel cell comprising an anode and a cathode;
a fluid and heat transfer arrangement to transfer the heated second fluid from the cathode of the fuel cell to the anode of the electrolysis cell to transfer heat from the fuel cell to drive the electrolysis of the first fluid in the electrolysis cell;
means to supply the second fluid to the cathode of the fuel cell;
means to supply the fuel to the anode of the fuel cell;

means to supply the first fluid to the cathode of the electrolysis cell; and a fluid recycling arrangement comprising a recycling device to recycle at least some of the product fluid output by the electrolysis cell and at least some of the un-electrolyzed first fluid output by the electrolysis cell back to the electrolysis cell.

2. An electrolysis apparatus according to claim 1 wherein the fuel cell comprises a solid oxide fuel cell, and the electrolysis cell comprises a solid oxide electrolysis cell.

3. An electrolysis apparatus according to claim 1 wherein the anode of the fuel cell oxidizes the fuel to provide fuel products.

4. An electrolysis apparatus according to claim 3 comprising a fuel recycling arrangement to recycle at least some of the fuel products to the fuel cell.

5. An electrolysis apparatus according to claim 4 wherein the recycling arrangement comprises a fuel recycling device to recycle fuel products from the fuel cell.

6. An electrolysis apparatus according to claim 1 wherein at least some of the electrical power generated by the fuel cell can be transmitted to the electrolysis cell to provide power for the electrolysis cell.

7. An electrolysis apparatus according to claim 1 comprising a fuel converter to convert a precursor fuel to the fuel.

8. An electrolysis apparatus according to claim 7, including a heating means to heat the precursor fuel to effect the aforesaid conversion, the heating means comprising a heating fluid supply assembly to transfer heating fluid to the fuel converter.

9. An electrolysis apparatus according to claim 8 wherein the heating means comprises a heat exchanger having first and second sides the heating fluid passing on the first side and the precursor fuel passing on the second side.

10. An electrolysis apparatus according to claim 1 wherein at least one component of the second fluid is electrolyzed by the cathode of the fuel cell.

11. An electrolysis apparatus according to claim 3 including a combustor to provide combustion products, the combustor being arranged to combust at least some of the fuel products from the anode of the fuel cell.

12. An electrolysis apparatus according to claim 11 wherein the apparatus comprises a second fluid recycling arrangement to recycle combustion products from the combustor, and the combustor is provided in the second fluid recycling arrangement.

13. An electrolysis apparatus according to claim 1 wherein the means to supply the second fluid to the cathode of the fuel cell comprises a compressor to compress the second fluid.

14. An electrolysis apparatus according to claim 11 wherein the means to supply the second fluid to the cathode of the fuel cell comprises a second fluid recycling arrangement to recycle combustion products from the combustor.

15. An electrolysis apparatus according to claim 14 wherein the means to supply the second fluid to the cathode of the fuel cell provides an uninterrupted path for the flow of the second fluid to the anode of the electrolysis cell from the cathode of the fuel cell.

16. An electrolysis apparatus according to claim 1 wherein the fuel cell and the electrolysis cell are connected in series with one another with respect to the flow of the second fluid.

17. An electrolysis apparatus according to claim 1, wherein the means to supply the second fluid to the cathode of the fuel cell is arranged to supply the second fluid to the cathode side of the fuel cell, and the electrolysis apparatus comprises a second fluid exhaust arrangement to exhaust the second fluid from the anode of the electrolysis cell.

18. An electrolysis apparatus according to claim 1 comprising a gas turbine arrangement having a turbine and a compressor, the turbine being coupled to the compressor whereby the turbine can drive the compressor.

19. An electrolysis apparatus according to claim 18 wherein the gas turbine arrangement comprises turbine feed means to feed at least some of the second fluid, exhausted from the electrolysis cell, to the turbine.

20. An electrolysis apparatus according to claim 19 comprising an evaporator to recover heat from the second fluid, exhausted from the electrolysis cell, wherein said second fluid is delivered to the evaporator from the turbine.

21. An electrolysis apparatus according to claim 1 further including a first fluid heater to heat the first fluid to be supplied to the cathode of the electrolysis cell, the first fluid heater comprising a heat exchanger to transfer heat from the product fluid to the first fluid.

22. An electrolysis apparatus according to claim 21 wherein the first fluid heater heats the first fluid to a temperature above the boiling point of the first fluid.

23. An electrolysis apparatus according to claim 21 including a separator arrangement to condense water from the product fluid.

24. An electrolysis apparatus according to claim 23 wherein the separator arrangement is configured to recycle the condensed water to the first fluid heater.

25. An electrolysis apparatus according to claim 23 wherein the separator arrangement includes a first fluid feed assembly to feed the first fluid to an evaporator and to feed the first fluid from the evaporator to the first fluid heater.

26. An electrolysis apparatus according to claim 1 wherein a fuel recycling arrangement recycles at least some of the fuel products from the anode of the fuel cell to the anode of the fuel cell.

27. An electrolysis apparatus according to claim 1 wherein a second fluid recycling arrangement recycles at least some of the second fluid from the anode of the electrolysis cell to the cathode of the fuel cell.

28. An electrolysis apparatus according to claim 27 wherein a combustor is arranged in the second fluid recycling arrangement to combust at least some of the fuel products from the anode of the fuel cell in the second fluid flowing from the anode of the electrolysis cell to the cathode of the fuel cell.

29. An electrolysis apparatus according to claim 1, wherein the electrolysis cell is used to electrolyze a first fluid comprising liquid water to generate a product fluid comprising hydrogen gas.

30. An electrolysis apparatus according to claim 1, wherein the means to supply the second fluid to the cathode of the fuel cell comprises a supply of air.

31. An electrolysis apparatus comprising:
an electrolysis cell for receiving a first fluid, for electrolyzing a portion of the first fluid in order to generate a product fluid consisting of a substance that is a product of electrolysis performed by the electrolysis cell on the first fluid, and for outputting un-electrolyzed first fluid and the product fluid, wherein the electrolysis cell comprises an anode and a cathode;
a fuel cell to oxidize a fuel and to heat a second fluid, said second fluid being different than the fuel and different than the first fluid, the fuel cell comprising an anode and a cathode;
a fluid and heat transfer arrangement to transfer the heated second fluid from the cathode of the fuel cell to the anode of the electrolysis cell to transfer heat from the fuel cell to drive the electrolysis of the first fluid in the electrolysis cell;

a product fluid recycling arrangement comprising a recycling device to recycle a first portion of the product fluid and a first portion of any un-electrolyzed first fluid from the electrolysis cell to the cathode of the electrolysis cell;

a separator arrangement, different from the product fluid recycling arrangement, to receive a second portion of the product fluid and a second portion of any un-electrolyzed first fluid from the electrolysis cell, the separator arrangement including a separator to separate the un-electrolyzed first fluid from the product fluid, wherein the separator arrangement is configured to recycle the un-electrolyzed first fluid to the cathode of the electrolysis cell;

a supply of second fluid arranged to supply the second fluid to the cathode of the fuel cell;

a supply of fuel arranged to supply the second fluid to the cathode of the fuel cell; and a supply of first fluid arranged to supply the first fluid to the cathode of the electrolysis cell.

32. An electrolysis apparatus as claimed in claim 1 wherein the fuel cell and the electrolysis cell are each part of a single stack of electrochemical cell tubes.

33. A method of operating an electrolysis apparatus, the electrolysis apparatus comprising:

an electrolysis cell for receiving a first fluid, for electrolyzing a portion of the first fluid in order to generate a product fluid consisting of a substance that is a product of electrolysis performed by the electrolysis cell on the first fluid, and for outputting un-electrolyzed first fluid and the product fluid, wherein the electrolysis cell comprises an anode and a cathode;

a fuel cell to oxidize a fuel and to heat a second fluid, said second fluid being different than the fuel and different than the first fluid, the fuel cell comprising an anode and a cathode;

a fluid and heat transfer arrangement to transfer the heated second fluid from the cathode of the fuel cell to the anode of the electrolysis cell to transfer heat from the fuel cell to drive the electrolysis of the first fluid in the electrolysis cell;

a product fluid recycling arrangement comprising a recycling device to recycle a first portion of the product fluid and a first portion of any un-electrolyzed first fluid from the electrolysis cell to the cathode of the electrolysis cell;

a separator arrangement, different from the product fluid recycling arrangement, to receive a second portion of the product fluid and a second portion of any un-electrolyzed first fluid from the electrolysis cell, the separator arrangement including a separator to separate the un-electrolyzed first fluid from the product fluid, wherein the separator arrangement is configured to recycle the un-electrolyzed first fluid to the cathode of the electrolysis cell;

a supply of second fluid arranged to supply the second fluid to the cathode of the fuel cell;

a supply of fuel arranged to supply the second fluid to the cathode of the fuel cell; and a supply of first fluid arranged to supply the first fluid to the cathode of the electrolysis cell, the method comprising the steps of:
(a) supplying the second fluid to the cathode of the fuel cell;
(b) supplying fuel to the anode of the fuel cell;
(c) oxidizing the fuel at the anode to the fuel cell;
(d) heating the second fluid at the cathode of the fuel cell;
(e) transferring the heated second fluid from the cathode of the fuel cell to the anode of the electrolysis cell to transfer heat from the fuel cell to drive the electrolysis of the first fluid in the electrolysis cell;
(f) supplying the first fluid to the cathode of the electrolysis cell; and
(g) electrolysing the first fluid at the cathode of the electrolysis cell to generate the product fluid wherein at least steps (c) and (g) occur concurrently.

34. An electrolysis apparatus according to claim 1, wherein the product fluid consists of hydrogen or carbon monoxide.

35. An electrolysis apparatus according to claim 31, wherein the product fluid consists of hydrogen or carbon monoxide.

* * * * *